(12) United States Patent
Shoda

(10) Patent No.: US 11,277,567 B2
(45) Date of Patent: Mar. 15, 2022

(54) ELECTRONIC APPARATUS, CONTROL METHOD OF ELECTRONIC APPARATUS AND NON-TRANSITORY COMPUTER READABLE MEDIUM

(71) Applicant: CANON KABUSHIKI KAISHA, Tokyo (JP)

(72) Inventor: Ryosuke Shoda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 16/725,933

(22) Filed: Dec. 23, 2019

(65) Prior Publication Data

US 2020/0213520 A1 Jul. 2, 2020

(30) Foreign Application Priority Data

Dec. 26, 2018 (JP) .............................. JP2018-242767

(51) Int. Cl.
*H04N 5/232* (2006.01)
*H04N 1/00* (2006.01)

(52) U.S. Cl.
CPC ..... *H04N 5/23293* (2013.01); *H04N 1/00148* (2013.01); *H04N 1/00347* (2013.01); *H04N 5/23203* (2013.01)

(58) Field of Classification Search
CPC ........... H04N 5/23293; H04N 1/00148; H04N 1/00347; H04N 5/23203; H04N 5/23216;
(Continued)

(56) References Cited

U.S. PATENT DOCUMENTS

| 2011/0107220 A1* | 5/2011 | Perlman | H04N 19/166 715/720 |
| 2014/0118333 A1* | 5/2014 | Ishida | G09G 3/20 345/214 |

(Continued)

FOREIGN PATENT DOCUMENTS

| CN | 102857689 A | 1/2013 |
| EP | 2046020 A1 | 4/2009 |

(Continued)

OTHER PUBLICATIONS

The above patent documents were cited in a European Search Report dated Apr. 28, 2020, which is enclosed, that issued in the corresponding European Patent Application No. 19218410.9.

(Continued)

*Primary Examiner* — Nhan T Tran
(74) *Attorney, Agent, or Firm* — Cowan, Liebowitz & Latman, P.C.

(57) ABSTRACT

An electronic apparatus according to the present invention includes at least one memory and at least one processor which function as: a first acquisition unit configured to acquire a captured image; and a control unit configured to perform control, so that a file of the image acquired by the first acquisition unit is recorded in a storage, in response to an image capturing instruction from a user, wherein in a case where a partial range of the captured image is displayed on a display as a live view image, the control unit further performs control so that a thumbnail image corresponding to the live view image is recorded in association with the file.

7 Claims, 12 Drawing Sheets

(58) Field of Classification Search
CPC .. H04N 5/23229; H04N 5/76; H04N 5/23248; H04N 5/23206; H04N 5/23238; H04N 5/232935; H04N 13/363; G11B 27/11; G11B 27/34; G11B 27/326; G06F 2203/04806; G06F 1/1686; G06F 1/1626; G06F 3/011; G06F 3/04815; G06F 3/04845

See application file for complete search history.

(56) References Cited

U.S. PATENT DOCUMENTS

| | | | |
|---|---|---|---|
| 2016/0373828 A1* | 12/2016 | Seol | H04N 21/8549 |
| 2017/0316806 A1 | 11/2017 | Warren et al. | |
| 2018/0109729 A1* | 4/2018 | Jang | H04N 5/232935 |
| 2018/0184000 A1* | 6/2018 | Lee | H04N 5/232945 |

FOREIGN PATENT DOCUMENTS

| | | | |
|---|---|---|---|
| EP | 2960857 A1 | 12/2015 | |
| EP | 2995092 A1 | 3/2016 | |
| EP | 3313060 A2 | 4/2018 | |
| JP | 2006303707 A * | 11/2006 | ............ H04N 5/232 |
| JP | 2017-108356 A | 6/2017 | |
| WO | 00/62542 A1 | 10/2000 | |
| WO | 2018/117757 A1 | 6/2018 | |

OTHER PUBLICATIONS

The above patent document was cited in a European Office Action dated May 28, 2021, which is enclosed, that issued in the corresponding European Patent Application No. 19218410.9.

The above foreign document was cited in a Jul. 22, 2021 Chinese Office Action, which is enclosed with an English Translation, that issued in Chinese Patent Application No. 201911366020.X.

* cited by examiner

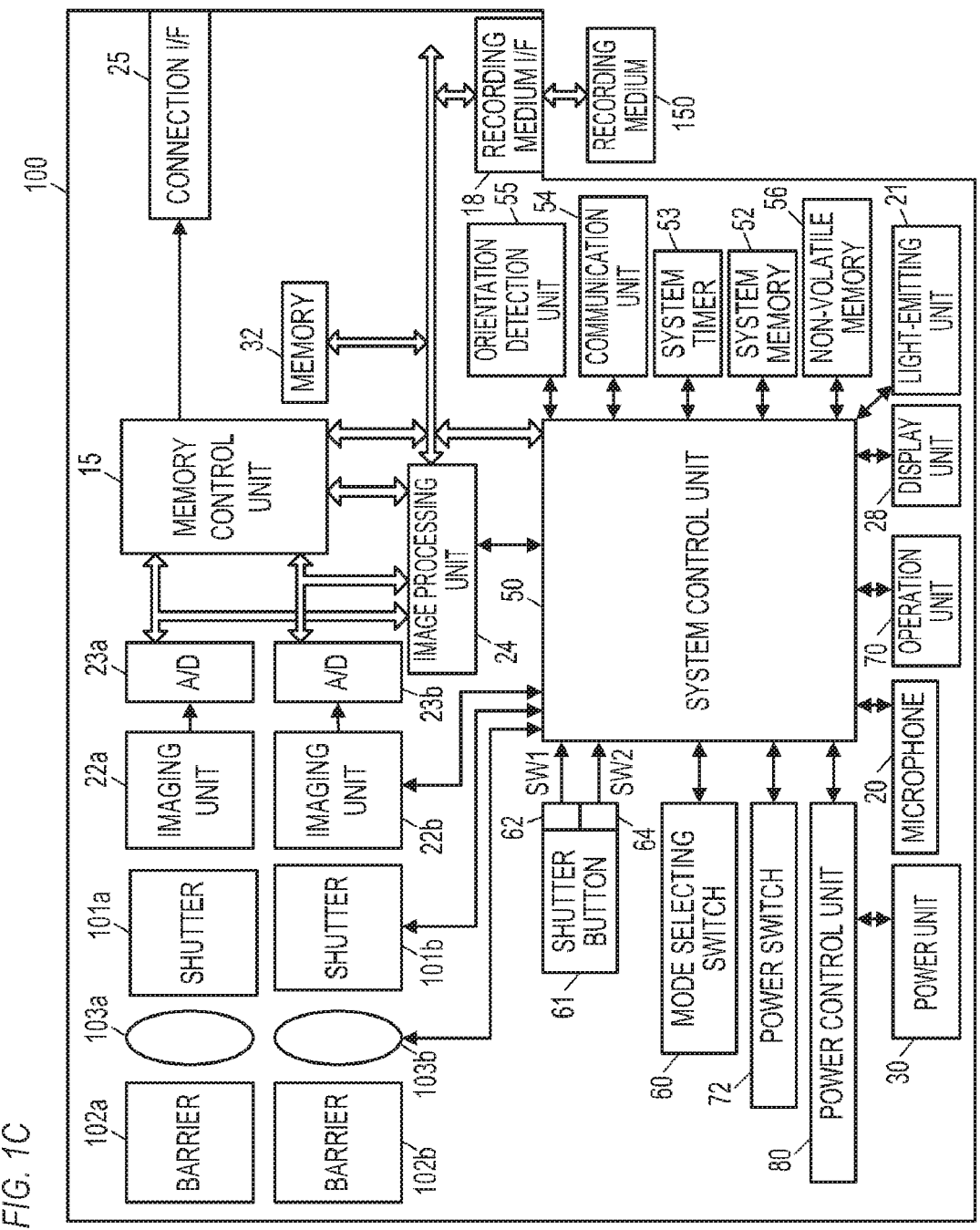

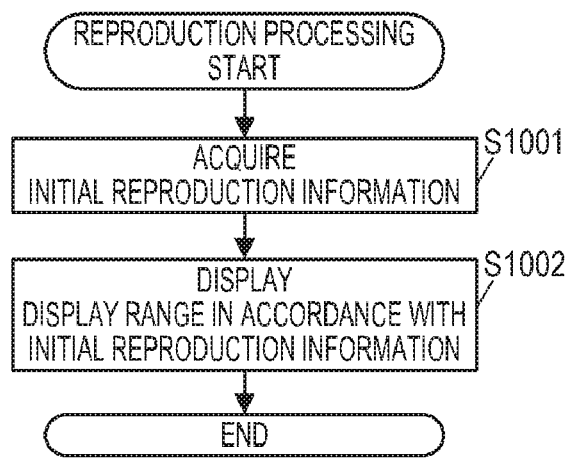

ELECTRONIC APPARATUS, CONTROL METHOD OF ELECTRONIC APPARATUS AND NON-TRANSITORY COMPUTER READABLE MEDIUM

BACKGROUND OF THE INVENTION

Field of the Invention

The present invention relates to an electronic apparatus, a control method of the electronic apparatus and a non-transitory computer readable medium, and more particularly to a method of recording an image having a wide range.

Description of the Related Art

An integrated type omnidirectional camera ((fully) spherical camera) that can capture an omnidirectional image ((fully) spherical image), which has two wide angle lenses (e.g. fish eye lenses) in the front and the back of a camera is becoming popular. Generally, an omnidirectional camera does not include a display for live viewing because of the characteristic of the way of capturing an omnidirectional image, so remote live view display is performed on a display of a smartphone connected to the omnidirectional camera, in order to observe an object (captured image).

Japanese Patent Application Publication No. 2017-108356 discloses a technique to display a plurality of information corresponding to a plurality of view points respectively, in order to easily observe a captured omnidirectional image from a desired view point.

As illustrated in FIG. 11A, in the case of a remote live view display of a captured omnidirectional image, a part of the omnidirectional image is clipped and displayed on a screen. The user can freely change the display range (range displayed on the screen; clipping range) of the omnidirectional image by a "flick" operation or the like.

However in the case of checking the captured (recorded) omnidirectional image on a personal computer (PC) or the like, an entire image of the omnidirectional image is displayed as a thumbnail image of a file of the omnidirectional image, as illustrated in FIG. 11B. Since the impression of this thumbnail image does not match with the impression of the display range of the remote live view display when the image was captured, the user cannot easily recognize which scene of the omnidirectional image is captured in each file.

Furthermore, when a file is reproduced, a range of the omnidirectional image, which is captured in a predetermined direction (e.g. front direction of the spherical camera), is displayed first as the display range. Therefore, the impression of the display range when the reproduction is started does not match with the impression of the display range of the remove live view display when the image was captured, and the user cannot easily recognize which scene of the omnidirectional image is captured in the reproduced file.

SUMMARY OF THE INVENTION

The present invention provides a technique to allow a user to easily recognize which scene of the image file is captured in a file.

The present invention in its first aspect provides an electronic apparatus comprising at least one memory and at least one processor which function as:

a first acquisition unit configured to acquire a captured image; and a control unit configured to perform control, so that a file of the image acquired by the first acquisition unit is recorded in a storage, in response to an image capturing instruction from a user, wherein in a case where a partial range of the captured image is displayed on a display as a live view image, the control unit further performs control so that a thumbnail image corresponding to the live view image is recorded in association with the file.

The present invention in its second aspect provides an electronic apparatus comprising at least one memory and at least one processor which function as:

a first acquisition unit configured to acquire a captured image; and a control unit configured to perform control so that a file of the image acquired by the first acquisition unit is recorded in a storage, in response to an image capturing instruction from a user, wherein in a case where a partial range of the captured image is displayed on a display as a live view image, the control unit further performs control so that information on the partial range of the image corresponding to the live view image at a predetermined timing is recorded in association with the file as information on a range that is displayed first when the file is reproduced.

The present invention in its third aspect provides a control method of an electronic apparatus, comprising:

an acquisition step of acquiring a captured image; and a control step of performing control, so that a file of the image acquired in the acquisition step is recorded in a storage, in response to an image capturing instruction from a user, wherein in a case where a partial range of the captured image is displayed on a display as a live view image, in the control step, control is further performed so that a thumbnail image corresponding to the live view image is recorded in association with the file.

The present invention in its fourth aspect provides a control method of an electronic apparatus, comprising:

an acquisition step of acquiring a captured image; and a control step of performing control so that a file of the image acquired in the acquisition step is recorded in a storage, in response to an image capturing instruction from a user, wherein in a case where a partial range of the captured image is displayed on a display as a live view image, in the control step, control is further performed so that information on the partial range of the image corresponding to the live view image at a predetermined timing is recorded in association with the file as information on a range that is displayed first when the file is reproduced.

The present invention in its fifth aspect provides a non-transitory computer readable medium that stores a program, wherein the program causes a computer to execute:

an acquisition step of acquiring a captured image; and a control step of performing control, so that a file of the image acquired in the acquisition step is recorded in a storage, in response to an image capturing instruction from a user, and in a case where a partial range of the captured image is displayed on a display as a live view image, in the control step, control is further performed so that a thumbnail image corresponding to the live view image is recorded in association with the file.

The present invention in its sixth aspect provides a non-transitory computer readable medium that stores a program, wherein the program causes a computer to execute:

an acquisition step of acquiring a captured image; and a control step of performing control so that a file of the image acquired in the acquisition step is recorded in a storage, in response to an image capturing instruction from a user, and in a case where a partial range of the captured image is displayed on a display as a live view image, in the control step, control is further performed so that information on the partial range of the image corresponding to the live view image at a predetermined timing is recorded in association with the file as information on a range that is displayed first when the file is reproduced.

Further features of the present invention will become apparent from the following description of exemplary embodiments with reference to the attached drawings.

BRIEF DESCRIPTION OF THE DRAWINGS

FIG. 1C is a block diagram depicting the digital camera;

FIG. 10 is a flow chart depicting a reproduction processing; and

DESCRIPTION OF THE EMBODIMENTS

Figure 1A:
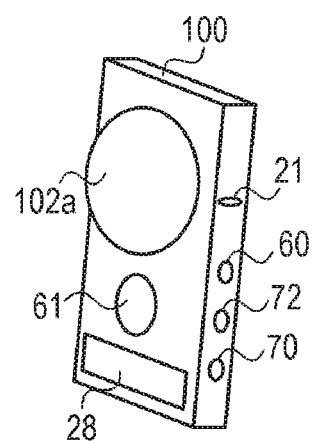
FIG. 1A and FIG. 1B are external views of a digital camera.
Figure 1B:
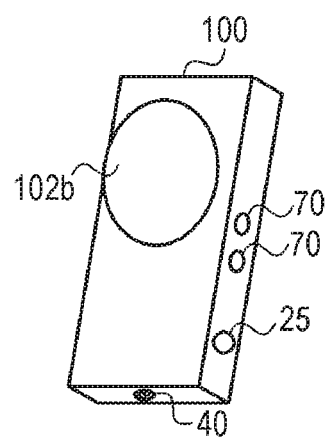

Embodiments of the present invention will be described with reference to the drawings. FIG. 1A is a front perspective view (external view) of a digital camera 100 (image-capturing apparatus), which is an electronic apparatus according to this embodiment. FIG. 1B is a rear perspective view (external view) of the digital camera 100. The digital camera 100 is an omnidirectional camera ((fully) spherical camera).

A barrier 102a is a protective window for a front camera unit of which image capturing range is a front area of the digital camera 100. The front camera unit is a wide angel camera unit of which image capturing range is a wide range on the front side of the digital camera 100 that is at least 180° vertically and horizontally, for example. A barrier 102b is a protective window for a rear camera unit of which image capturing range is a rear area of the digital camera 100. The rear camera unit is a wide-angle camera unit of which image capturing range is a wide range in the rear side of the digital camera 100 that is at least 180° vertically and horizontally, for example.

A display unit 28 displays various information. A shutter button 61 is an operation unit (operation member) to instruct image capturing. A mode selecting switch 60 is an operation unit to switch various modes. A connection I/F 25 is a connector to connect a connection cable to the digital camera 100, whereby the digital camera 100 is connected to an external apparatus (e.g. smartphone, personal computer. TV) via the connection cable. An operation unit 70 has various switches, buttons, dials, touch sensors or the like to receive various operations from the user. A power switch 72 is a push button to switch the power supply ON/OFF.

A light-emitting unit 21 is a light-emitting member (e.g. as a light-emitting diode (LED)) that notifies the user on various states of the digital camera 100 using light-emitting patterns and light-emitting colors. A fixing unit 40 has a screw hole for a tripod, for example, and is used to install and fix the digital camera 100 to a fixture (e.g. tripod).

FIG. 1C is a block diagram depicting a configuration example of the digital camera 100.

The barrier 102a covers an image-capturing system (e.g. an image capturing lens 103a, a shutter 101a, an image-capturing unit 22a) of the front camera unit, so as to prevent contamination of and damage to the image-capturing system. The image capturing lens 103a is a lens group including a zoom lens and a focus lens, and is a wide-angle lens. The shutter 101a is a shutter which has an aperture function to adjust the incident quantity of the object light to the image-capturing unit 22a. The image-capturing unit 22a is an image pickup element (image sensor) constituted of a CCD, a CMOS element or the like to convert an optical image into an electric signal. An A/D convertor 23a converts an analog signal outputted from the image-capturing unit 22a into a digital signal. Instead of disposing the barrier 102a, the outer surface of the image capturing lens 103a may be exposure so that the image capturing lens 103a prevents contamination of and damage to the other components of the image-capturing system (e.g. shutter 101a, image-capturing unit 22a).

The barrier 102b covers an image-capturing system (e.g. an image capturing lens 103b, a shutter 101b, an image-capturing unit 22b) of the rear camera unit, so as to prevent contamination of and damage to the image-capturing system. The image capturing lens 103b is a lens group including a zoom lens and a focus lens, and is a wide-angle lens. The shutter 101b is a shutter which has an aperture function to adjust the incident quantity of the object light to the image-capturing unit 22b. The image-capturing unit 22b is an image pickup element constituted of a CCD, a CMOS element or the like to convert an optical image into an electric signal. An A/D convertor 23b converts an analog signal outputted from the image-capturing unit 22b into a digital signal. Instead of disposing the barrier 102b, the outer surface of the image capturing lens 103b may be exposed so that the image capturing lens 103b prevents contamination of and damage to the other components of the image-capturing system (e.g. shutter 101b, image-capturing unit 22b).

A virtual reality (VR) image is captured by the image-capturing unit 22a and the image-capturing unit 22b. The VR image is an image that can be VR-displayed (displayed in display mode "VR view"). The VR image includes an omnidirectional image ((fully) spherical image) captured by an omnidirectional camera ((fully) spherical camera), and a panoramic image having an image range (effective image range) that is wider than the display range of the display unit. The VR image includes not only a still image but also a moving image and a live view image (image acquired from the camera in near real-time). The VR image has an image range (effective image range) equivalent to the visual field that is at most 360° in the vertical direction (vertical angle, angle from the zenith, elevation angle, depression angle, altitude angle, pitch angle), and 360° in the horizontal direction (horizontal angle, azimuth angle, yaw angle).

The VR image includes an image that has an angle of view (visual field range) wider than the angle of view that a standard camera can capture, even if the angle is less than 360° vertically and 360° horizontally, or an image that has an image range (effective image range) wider than a possible display range of the display unit. For example, an image captured by a spherical camera that can capture an image of an object in a visual field (angle of view) that is 360° horizontally (horizontal angle, azimuth angle), and 210° vertically with the zenith at the center, is a type of VR image. Further, an image captured by a camera that can capture an image of an object in a visual field (angle of view) that is 180° horizontally (horizontal angle, azimuth angle) and 180° vertically with the horizontal direction at the center, is a type of VR image. In other words, an image which has an image range of a visual field that is at least 160° (±80°) in the vertical direction and horizontal direction respectively, and which has an image range that is wider than a range that an individual can visually recognize at once, is a type of VR image.

When this VR image is VR-displayed (displayed in the display mode "VR view"), the seamless omnidirectional image can be viewed in the horizontal direction (horizontally rotating direction) by changing the orientation of the display apparatus (display apparatus that displays the VR image) in the horizontally rotating direction. In terms of the vertical direction (vertically rotating direction), the seamless omnidirectional image can be viewed in the ±105° range from above (zenith), but the range that exceeds 105° from the zenith becomes a blank region where no image exists. The VR image can be defined as "an image of which image range is at least a part of a virtual space (VR space)".

The VR display (VR view) is a display method (display mode) in which the display range, to display an image in the visual field range in accordance with the orientation of the display apparatus, out of the VR image, can be changed. To view the image on a smartphone, which is a display apparatus, an image in the visual field range, in accordance with the orientation of the smartphone, is displayed. For example, it is assumed that an image in the visual angle (angle of view) centered at 0° in the horizontal direction (specific azimuth, such as North) and 90° in the vertical direction (90° from zenith, that is horizontal) out of the VR image, is being displayed at a certain point. If the orientation of the display apparatus is front/back inverted (e.g. display surface is changed from facing south to facing north), the display range is changed to an image in the visual angle centered at 180° in the horizontal direction (opposite azimuth, such as South) and 90° in the vertical direction (horizontal) out of the same VR image. In the case where a user views the image while holding the smartphone, the image displayed on the smartphone changes from an image to the North to an image to the South if the smartphone is turned from North to South (in other words, if the user turns their back). By this VR display, the user can visually experience the sensation (sense of immersion) as if the user were at the spot of the VR image (VR space).

The method of displaying the VR image is not limited to the above description. The display range may be moved (scrolled) in accordance with the user operation on a touch panel, direction button or the like, instead of by changing the orientation. When the VR image is displayed (when the display mode is "VR view"), the display range may be changed not only by changing the orientation, but also by a touch move on the touch panel, a drag operation by mouse, pressing the direction button and the like.

An image processing unit 24 performs a predetermined processing, such as pixel interpolation, resizing (e.g. zoom out), and color conversion, on the data from the A/D convertor 23a and the A/D convertor 23b, or the data from the memory control unit 15. The image processing unit 24 also performs a predetermined arithmetic processing using captured image data. A system control unit 50 performs exposure control and distance measurement control on the basis of the arithmetic result acquired by the image processing unit 24. Thereby the through the lens (TTL) type autofocus (AF) processing, auto exposure (AE) processing, pre-flash emission (EF) processing and the like are performed. The image processing unit 24 also performs a predetermined arithmetic processing using the captured image data, and performs TTL type auto white balance (AWB) processing on the basis of the acquired arithmetic result. Further, the image processing unit 24 performs basic image processing on the two images (two fish eye images; two wide angle images) acquired from the A/D convertor 23a and the A/D convertor 23b, and performs image connection processing to combine the two images on which the basic processing was performed, so as to generate a single VR image. Furthermore, the image processing unit 24 performs image clipping processing, zooming processing, distortion correction and the like to display the VR image when the VR image is VR-displayed in live view or when reproduced, and performs rendering to write the processing result in a VRAM of a memory 32.

In the image connection processing, the image processing unit 24 uses one of the two images as a reference image and the other as a comparative image, calculates the amount of deviation between the reference image and the comparative image for each area by pattern matching processing, and detects a connection position to connect the two images on the basis of the amount of deviation in each area. Considering the detected connection position and the lens characteristic of each optical system, the image processing unit 24 corrects the distortion of each image by the geometric conversion so as to convert each image into an image in a spherical format (spherical image format). Then the image processing unit 24 combines (blends) the two images in the spherical format, so as to generate one spherical image (VR image). The generated spherical image is an image based on the equidistant cylindrical projection, and the position of each pixel of the spherical image can be corresponded with the coordinates on the surface of a sphere (VR space) (3D mapping).

The output data from the A/D convertors 23a and 23b are written in the memory 32 via the image processing unit 24 and the memory control unit 15, or via the memory control unit 15 without passing through the image processing unit 24. The memory 32 stores image data which is acquired by the image-capturing units 22a and 22b and converted into digital data by the AD convertors 23a and 23b, for example. The memory 32 also stores the image data to be transferred to a wirelessly-connected external apparatus (e.g. smartphone) via the communication unit 54, and the image data to be outputted from the connection I/F 25 to an external display. The memory 32 has a storage capacity that is sufficient to store a predetermined number of still images, or a predetermined time of moving images and sound data.

The memory 32 also functions as a memory for image display (video memory). The data for image display, which is stored in the memory 32, can be transferred to a wirelessly-connected external apparatus (e.g. smartphone) via the communication unit 54, or can be outputted to an external display via the connection I/F 25. The VR image, which was generated by the image processing unit 24 from the images captured by the image-capturing units 22a and 22b, and was stored in the memory 32, may be transferred to a wirelessly-connected external apparatus (e.g. smartphone) via the communication unit 54, and displayed on the external apparatus side. Thereby the external apparatus (e.g. smartphone) can function as an electronic view finder, and perform remote live view display (remote LV display). The remote LV display can also be performed by sequentially transferring the VR images stored in the memory 32 to an external display, and displaying the VR images on the screen of the external display. Hereafter, the images displayed by the remote LV display are called "remote live view images" (remote LV images).

A non-volatile memory 56 is a memory that functions as an electrically erasable and recordable recording medium, such as EEPROM. In the non-volatile memory 56, constants, programs and the like for operation of the system control unit 50 are recorded. "Programs" here refer to computer programs that execute various flow charts, which will be described later in this embodiment.

The system control unit 50 is a control unit that includes at least one processor or circuit, and controls the digital camera 100 in general. The system control unit 50 implements each of the later mentioned processing of this embodiment by executing a program recorded in the above-mentioned non-volatile memory 56. The system memory 52 is a RAM, for example, and in the system memory 52, constants and variables for the operation of the system control unit 50 and programs read from the non-volatile memory 56 are developed. The system control unit 50 also controls display by controlling the memory 32, the image processing unit 24, the memory control unit 15 and the like. A system timer 53 is a timer that measures the time used for various controls and the time of internal clocks.

The mode selecting switch 60, the shutter button 61, the operation unit 70 and the power switch 72 are used to input various operation instructions to the system control unit 50.

The mode selecting switch 60 switches the operation mode of the system control unit 50 to one of a still image recording mode, a moving image capturing mode, a reproduction mode, a communication connecting mode and the like. The still image recording mode includes an auto image capturing mode, an auto scene determination mode, a manual mode, an aperture priority mode (Av mode), a shutter speed priority mode (Tv mode) and a program AE mode. Various scene modes, to set image capturing for each image capturing scene, and a custom mode are also included. The user can directly select one of these modes using the mode selecting switch 60. After switching to an image capturing mode list screen using the mode selecting switch 60, the user may selectively switch to one of the plurality of modes displayed on the display unit 28 using another operation member. The moving image capturing mode may include a plurality of modes in the same manner.

The shutter button 61 includes a first shutter switch 62 and a second shutter switch 64. The first shutter switch 62 is turned ON in the middle of the operation of the shutter button 61, that is, in the half-depressed state (image capturing preparation instruction), and generates a first shutter switch signal SW1. By the first shutter switch signal SW1, the system control unit 50 starts the image capturing preparation operation, such as the auto focus (AF) processing, the auto exposure (AE) processing, the auto white balance (AWB) processing, and the pre-flash (EF) processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the image-capturing units 22a and 22b to writing the image data to the recording medium 150.

The shutter button 61 is not limited to an operation member that can perform a two-step operation (half-depression and full-depression), but may be an operation member that can perform only a one step of depression. In this case, the image capturing preparation operation and the image capturing processing are performed continuously by a one step depression. This is the same as the case of fully depressing the shutter button that can perform both half depression and full depression (case where the first shutter switch signal SW1 and the second shutter switch signal SW2 are generated almost simultaneously).

The operation unit 70 functions as various functional buttons that perform the functions assigned for each scene, by selecting various functional icons and options displayed on the display unit 28. The functional buttons include: an end button, a return button, an image forward button, a jump button, a preview button and an attribute change button. For example, when the menu button is depressed, a menu screen, that allows various settings, is displayed on the display unit 28. The user operates the operation unit 70 while viewing the menu screen displayed on the display unit 28, whereby various settings can be performed intuitively.

The power switch 72 is a push button to switch the power ON/OFF A power control unit 80 includes a battery detection circuit, a DC-DC convertor, and a switch circuit to select a block to be energized, so as to detect whether the battery is installed, a type of the battery, a residual amount of battery power and the like. The power control unit 80 also controls the DC-DC convertor on the basis of the detection result and the instructions of the system control unit 50, and supplies the required voltage to each component, including the recording medium 150, for a required period of time. A power supply unit 30 includes: a primary battery (e.g. alkali battery, lithium battery), a secondary battery (e.g. NiCd battery, an NiMH batter, an Li battery), and an AC adapter.

A recording medium I/F 18 is an interface with the recording medium 150 (e.g. memory card hard disk). The recording medium 150 is a storage unit (e.g. memory card) to record captured images, and is constituted of a semiconductor memory, an optical disk, a magnetic disk or the like. The recording medium 150 may be an exchangeable recording medium that is detachable from the digital camera 100 or may be a recording medium embedded in the digital camera 100.

The communication unit 54 transmits/receives image signal and sound signals to/from an external apparatus that is connected wirelessly or via a cable. The communication unit 54 can also be connected to a wireless local area network (LAN) or Internet. The communication unit 54 transfers the VR images, which are captured by the image-capturing units 22a and 22b, generated by the image processing unit 24 and are stored in the memory 32, to a wirelessly-connected external apparatus (e.g. smartphone) via the communication unit 54, and displays the VR images on the external apparatus side. Thereby the external apparatus (e.g. smartphone) can function as an electronic view finder, and perform remote live view display (remote LV display). The communication unit 54 can also transmits an image recorded in the recording medium 150, and can receive images and various other information from an external apparatus.

An orientation detection unit 55 detects an orientation of the digital camera 100 with respect to the direction of gravity. On the basis of the orientation detected by the orientation detection unit 55, it can be determined whether the images captured by the image-capturing units 22a and 22b are images captured when the digital camera 100 is in the horizontal position, or images captured when the digital camera 100 is in the vertical position. It can also be determined to what degree the digital camera 100 was inclined in the three axis directions (rotation directions), that is, the yaw direction, the pitch direction and the roll direction, when the images were captured by the image-capturing units 22a and 22b. The system control unit 50 can add the orientation information in accordance with the orientation detected by the orientation detection unit 55 to the image file of the VR image captured by the image-capturing units 22a and 22b, or can rotate the image (adjust the orientation of the image so as to correct the inclination (zenith correction)) and record the rotated image. One or a set of a plurality of sensors, out of the acceleration sensor, gyro sensor, geo magnetic sensor, azimuth sensor, altitude sensor and the like may be used as the orientation detection unit 55. Using the acceleration sensor, gyro sensor, azimuth sensor or the like, which constitute the orientation detection unit 55, the movement of the digital camera 100 (e.g. pan, tilt, elevate, still) can be detected.

A microphone 20 is a microphone that collects sound around the digital camera 100, that is recorded as sound of the VR image which is a moving image (VR moving image). A connection I/F 25 is a connection plug to which an HDMI® cable, USB cable or the like is connected so as to transmit or receive images to/from an external apparatus.

Figure 2A:
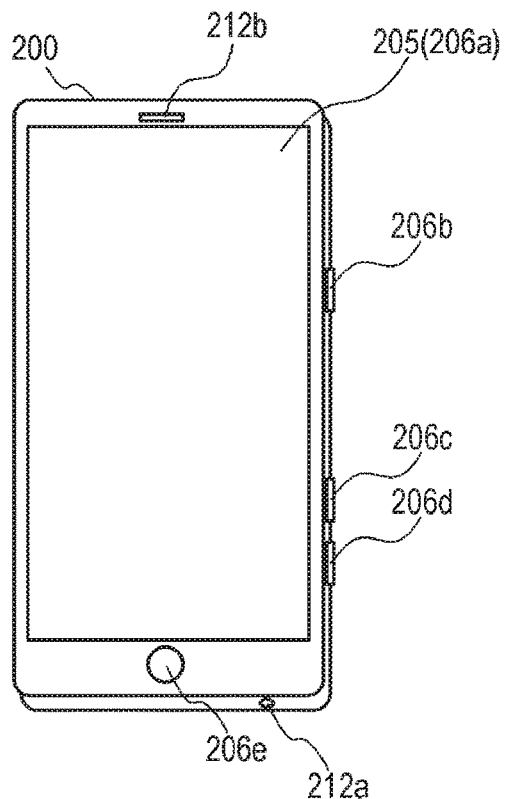
FIG. 2A is an external view of a display control apparatus.

FIG. 2A is an external view of a display control apparatus 200. The display control apparatus 200 is a display apparatus, such as a smartphone. A display 205 is a display unit that displays images and various information. The display 205 is integrated with a touch panel 206a, so that the touch operation on the display surface of the display 205 can be detected. The display control apparatus 200 can VR-display a VR image (VR content) on the display 205. An operation unit 206b is a power button which receives operation to switch the power of the display control apparatus 200 ON/OFF. An operation unit 206c and an operation unit 206d are volume buttons to increase/decrease the volume of the sound outputted from a sound output unit 212. An operation unit 206e is a home button to display a home screen on the display 205. A sound output terminal 212a is an earphone jack, which is a terminal to output sound signals to an earphone, an external speaker or the like. A speaker 212b is a built-in speaker to output sound.

Figure 2B:
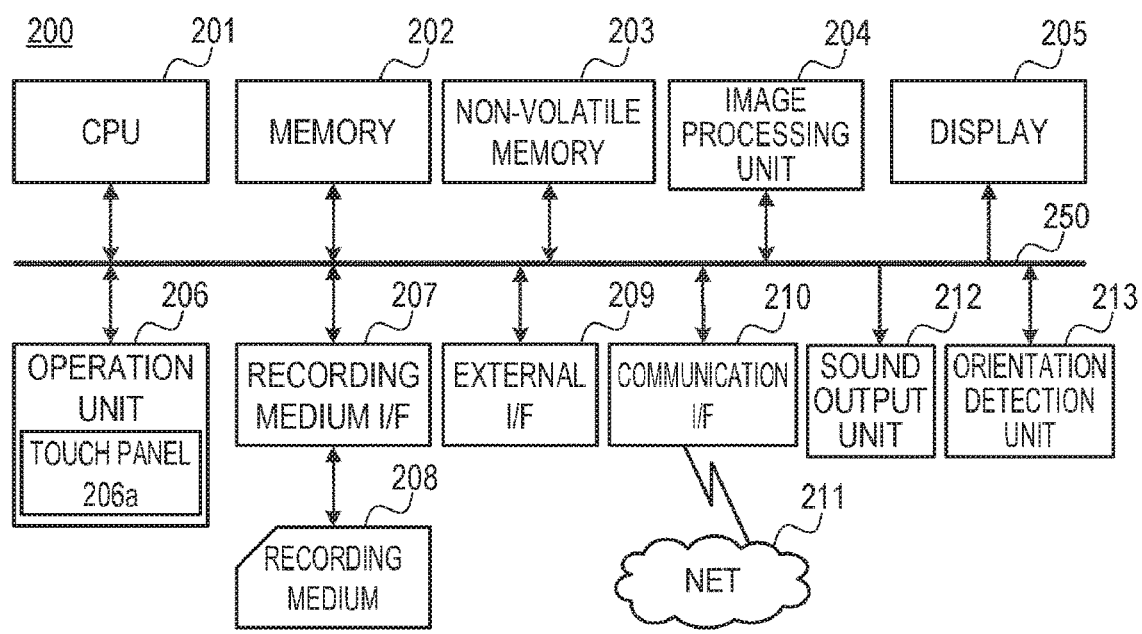
FIG. 2B is a block diagram depicting the display control apparatus.

FIG. 2B is a block diagram depicting a configuration example of the display control apparatus 200. A CPU 201, a memory 202, a non-volatile memory 203, an image processing unit 204, a display 205, an operation unit 206, a recording medium I/F 207, an external I/F 209 and a communication 1F 210 are connected to an internal bus 250. The sound output unit 212 and an orientation detection unit 213 are also connected to the internal bus 250. Each unit connected to the internal bus 250 is configured such that data can be exchanged with other units via the internal bus 250.

The CPU 201 is a control unit that controls the display control apparatus 200 in general, and includes at least one processor or circuit. The memory 202 is a RAM (e.g. volatile memory using a semiconductor element). The CPU 201 controls each unit of the display control apparatus 200 using the memory 202 as a work memory, in accordance with the program stored in the non-volatile memory 203, for example. The non-volatile memory 203 stores such as data as image data and sound data, and various programs for the CPU 201 to operate. The non-volatile memory 203 is a flash memory or a ROM, for example.

The image processing unit 204 performs various image processing on the images stored in the non-volatile memory 203 and the recording medium 208, the image signals acquired via the external I/F 209, the images acquired via the communication I/F 210 and the like, on the basis of the control of the CPU 201. The image processing performed by the image processing unit 204 includes: the A/D conversion processing, D/A conversion processing, encoding processing of image data, compression processing, decoding processing, enlarging/reducing processing (resizing), noise reduction processing and color conversion processing. The image processing unit 204 also performs various types of image processing (e.g. panoramic development, mapping processing, conversion) on a VR image, which is an omnidirectional image or a wide range image, which is not an omnidirectional image but an image having a wide range. The image processing unit 204 may be configured by dedicated circuit blocks to perform a specific image processing. Depending on the type of image processing, the CPU 201 may perform the image processing in accordance with the program, without using the image processing unit 204.

The display 205 displays graphic user interface (GUI) screen constituting images and GUI on the basis of control of the CPU 201. The CPU 201 generates a display control signal in accordance with the program, and controls each unit of the display control apparatus 200 so as to generate image signals to display the images on the display 205, and output the image signals to the display 205. On the basis of the generated and outputted image signals, the display 205 displays the image. The display control apparatus 200 may include only the configuration up to the interface to output the image signals for the display 205 to display the images, and the display 205 may be an external monitor (e.g. TV) or the like. The display 205 can function as an electronic view finder and perform remote live view display (remove LV display) by displaying VR images, which are captured by the digital camera 100 (image-capturing apparatus) and are sequentially transferred via the communication I/F 210.

The operation unit 206 is an input device to receive user operation, which includes a text information input device (e.g. keyboard), a pointing device (e.g. mouse, touch panel), buttons, dials, a joystick, a touch sensor and a touch pad. In this embodiment, the operation unit 206 includes the touch panel 206a, and operation units 206b, 206c, 206d and 206e.

To the recording medium I/F 207, a recording medium 208 (e.g. memory card, CD, DVD) can be removably attached. On the basis of the control of the CPU 201, the recording medium I/F 207 reads data from the attached recording medium 208, or writes data to the recording medium 208. The external I/F 209 is an interface that is connected with an external apparatus via a cable or wirelessly, and inputs/outputs image signals and sound signals. The communication I/F 210 is an interface to transmit/ receive various data (e.g. files, commands) by communicating with an external apparatus via the Internet 211 or the like.

The sound output unit 212 outputs the sound of a moving image or music data, operation tones, ring tones, various notification tones and the like. The sound output unit 212 includes the sound output terminal 212a to connect an earphone and the like, and the speaker 212b. The sound output unit 212 may output the sound data to an external speaker via wireless communication or the like.

The orientation detection unit 213 detects the orientation (inclination) of the display control apparatus 200 with respect to the direction of gravity, and the orientation of the display control apparatus 200 with respect to each axis in the yaw direction, pitch direction and roll direction. On the basis of the orientation detected by the orientation detection unit 213, it can be determined whether the display control apparatus 200 is held horizontally or vertically, and whether the display control apparatus 200 turns up or down, or in a diagonal orientation. It can also be detected whether the display control apparatus 200 is inclined in the rotation directions (e.g. yaw direction, pitch direction, roll direction), the degree of the inclination, and whether the display control apparatus 200 rotated in the rotation direction. One or a combination of sensors (e.g. acceleration sensor, gyro sensor, geo magnetic sensor, azimuth sensor, altitude sensor) may be used as the orientation detection unit 213.

As mentioned above, the operation unit 206 includes a touch panel 206a. The touch panel 206a is an input device, which is configured as a plane superimposed on the display 205, so that the coordinate information corresponding with the contacted position is outputted. The CPU 201 can detect the following operation performed on the touch panel 206a or the state thereof.

- a finger or pen which is not touching the touch panel 206a touches the touch panel 206a, that is, touch is started (hereafter Touch-Down)
- a finger or pen is touching the touch panel 206a (hereafter Touch-On)
- a finger or pen is moving in the touching state on the touch panel 206a (hereafter Touch-Move)
- a finger or pen, which is touching the touch panel 206a, is released from the touch panel 206a, that is, touch is ended (hereafter Touch-Up)
- Nothing is touching the touch panel 206a (hereafter Touch-Off)

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers and pen is detected.

These operations, states, and coordinates of the positions of the finger(s) or pen touching the touch panel 206a are notified to the CPU 201 via the internal bus, and on the basis of the notified information, the CPU 201 determines the kind of operation (touch operation) that was performed on the touch panel 206a. For Touch-Move, the CPU 201 can also determine the moving direction of the finger or pen on the touch panel 206a, on the basis of the change of the positional coordinates, for the vertical components and the horizontal components on the touch panel 206a respectively. If Touch-Move is detected for at least a predetermined distance, the CPU 201 determines that the slide operation was performed.

An operation of quickly moving a finger on the touch panel 206a for a certain distance in the touched state and releasing the finger is called "flick". In other words, flick is an operation of touching and moving the finger rapidly on the touch panel 206a. If Touch-Move is detected for at least a predetermined distance at a predetermined speed or faster, and Touch-Up is detected thereafter, the CPU 201 then determines that flick was performed (determines that flick was performed after the slide operation).

Further, a touch operation of touching a plurality of points (e.g. two points) simultaneously and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 206a, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, but either type may be used.

Figure 3A:
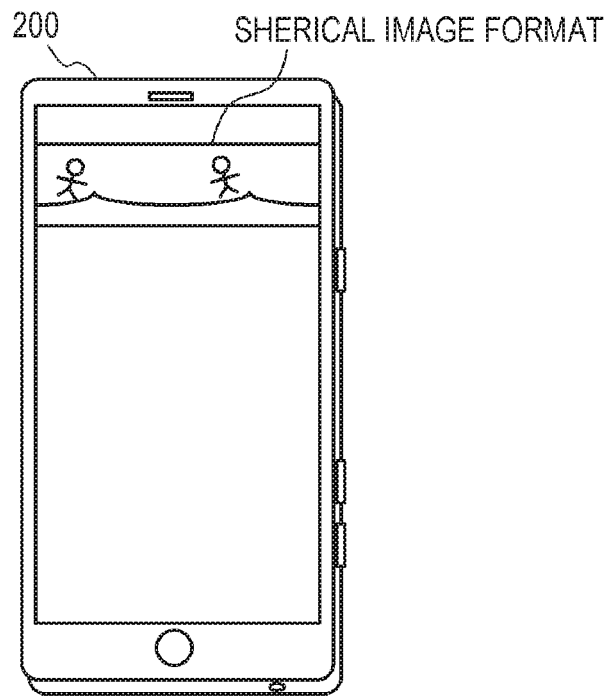
FIG. 3A and FIG. 3B are diagrams depicting an example of a remote live view display.
Figure 3B:
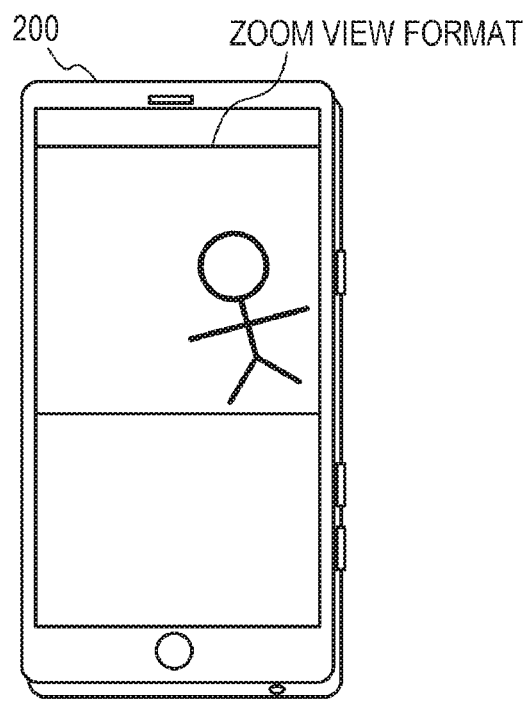

FIG. 3A and FIG. 3B are examples of the remove live view display on the display control apparatus 200. In this embodiment, the display formats of the remote live view display includes a spherical (omnidirectional) image format and a zoom view format. The spherical image format is a format of displaying the entire VR image captured by the digital camera 100 (image-capturing apparatus) on the display 205 using equidistant cylindrical projection, that is the so called "panoramic format". In other words, in the case of the spherical image format, the VR image captured by the digital camera 100 is displayed as is. FIG. 3A is an example of the remote live view display in the spherical image format. The zoom view format is a format of clipping a partial region (range) from the VR image captured by the digital camera 100, and displaying the clipped image on the display 205. In the zoom view format, a partial region is normally clipped and displayed on the basis of the region instructed by the user using the display control apparatus 200 (smartphone). FIG. 3B is an example of the remote live view display in the zoom view format. Using the operation unit 206, the user can switch the display mode between the display mode in the spherical format and the display mode in the zoom view format. The display modes that can be set are not limited to the spherical image format and the zoom view format, but may be display modes in other display formats.

Figure 4:
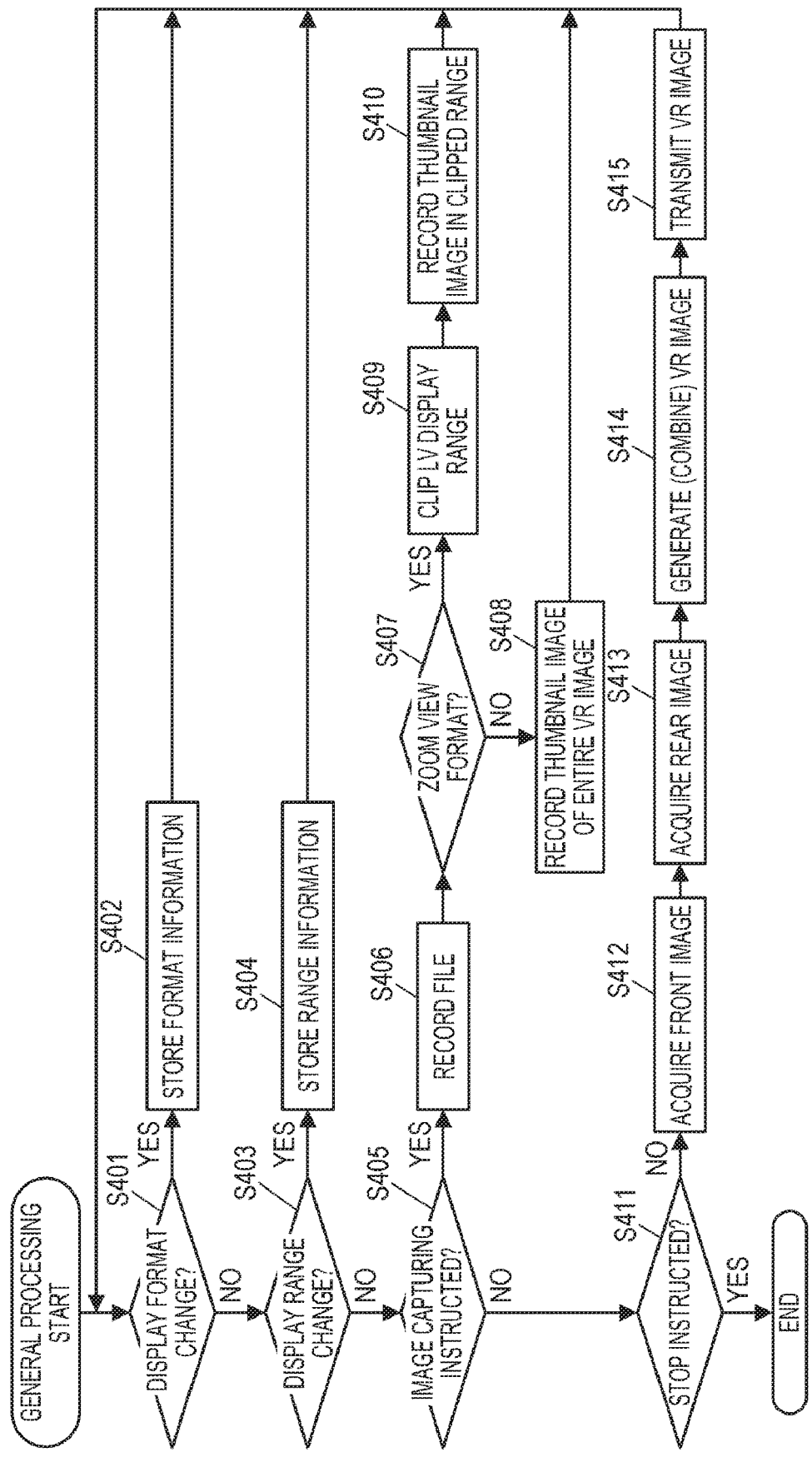
FIG. 4 is a flow chart depicting an example of the general processing.

FIG. 4 is a flow chart depicting an example of the general processing of the digital camera 100. This processing is implemented by the system control unit 50 developing the program recorded in the non-volatile memory 56 in the system memory 52, and executing the program. When the power of the digital camera 100 is turned ON, the processing in FIG. 4 starts.

In S401, the system control unit 50 determines whether or not a change in the display format (display mode) of the display control apparatus 200 was notified. Processing advances to S402 if notified, or to S403 if not. In S402, the system control unit 50 stores the format information, which indicates the notified display format (display format after the change; current display format) to the system memory 52 (update of the format information stored in the system memory 52). The processing in S401 is also a processing to determine whether or not the format information was received (acquired). In this embodiment, the format information is acquired from the display control apparatus 200 via the communication unit 54.

In S403, the system control unit 50 determines whether or not the change in the display range (range of captured image that is displayed in remote live view display) of the display control apparatus 200 was notified. Processing advances to S404 if notified, or to S405 if not. In S404, the system control unit 50 stores the range information on the notified display range (display range after the change; current display range) in the system memory 52 (update of the range information stored in the system memory 52). The range information indicates the direction of the view point and the visual angle (angle of view) when the captured VR image (equidistant cylindrical projection) is 3D-mapped. The range information may be other information that indicates the display range. The processing in S403 is also a processing to determine whether or not the range information was received (acquired). In this embodiment, the range information is acquired from the display control apparatus 200 via the communication unit 54.

In S405, the system control unit 50 determines whether or not an image capturing instruction was received from the user (image-capturing operation). Processing advances to S406 if the image capturing instruction was received, or to S411 if not. In S406, the system control unit 50 records the file of the captured VR image (equidistant cylindrical projection) in the recording medium 150.

In S407, the system control unit 50 determines whether or not the display format of the display control apparatus 200 is a format to display a partial range of the captured VR image (zoom view format) on the basis of the format information stored in the system memory 52. Processing advances to S409 if the display format is the zoom view format, or to S408 if not (if spherical image format).

In S408, the system control unit 50 records (generates and records) a thumbnail image in the file recorded in S406 on the basis of the captured VR image. In concrete terms, a thumbnail (e.g. image (image generated by reducing the VR image) which indicates the entire VR image that was captured (equidistant cylindrical projection), is record in the file.

In S409, the system control unit 50 performs 3D mapping of the captured VR image (equidistant cylindrical projection), and clips the display range from the VR image in accordance with the range information (direction of the view point and visual angle (angle of view)) stored in the system memory 52. In S410, the system control unit 50 records (generates and records) a thumbnail image in the file recorded in S406 on the basis of the image (display range) clipped in S409. In concrete terms, the system control unit 50 records a thumbnail image that indicates the display range (e.g. image generated by reducing an image in the display range) in the file.

In S411, the system control unit 50 determines whether or not the user instructed to stop the digital camera 100 (performed stop operation). If the user instructed to stop the digital camera 100, the system control unit 50 stops the digital camera 100 by performing various types of processing (shuts the power of the digital camera 100 OFF). Then the entire processing in FIG. 4 ends. Processing advances to S412 otherwise.

In S412, the system control unit 50 acquires (captures) a front image using the image-capturing unit 22a. In S413, the system control unit 50 acquires (captures) a rear image using the image-capturing unit 22b. In S414, using the image processing unit 24, the system control unit 50 combines the two images acquired in S412 and S413, so as to generate a single VR image (equidistant cylindrical projection). In S415, the system control unit 50 transmits the VR image generated in S414 (equidistant cylindrical projection) to the display control apparatus 200 via the communication unit 54.

Figure 5:
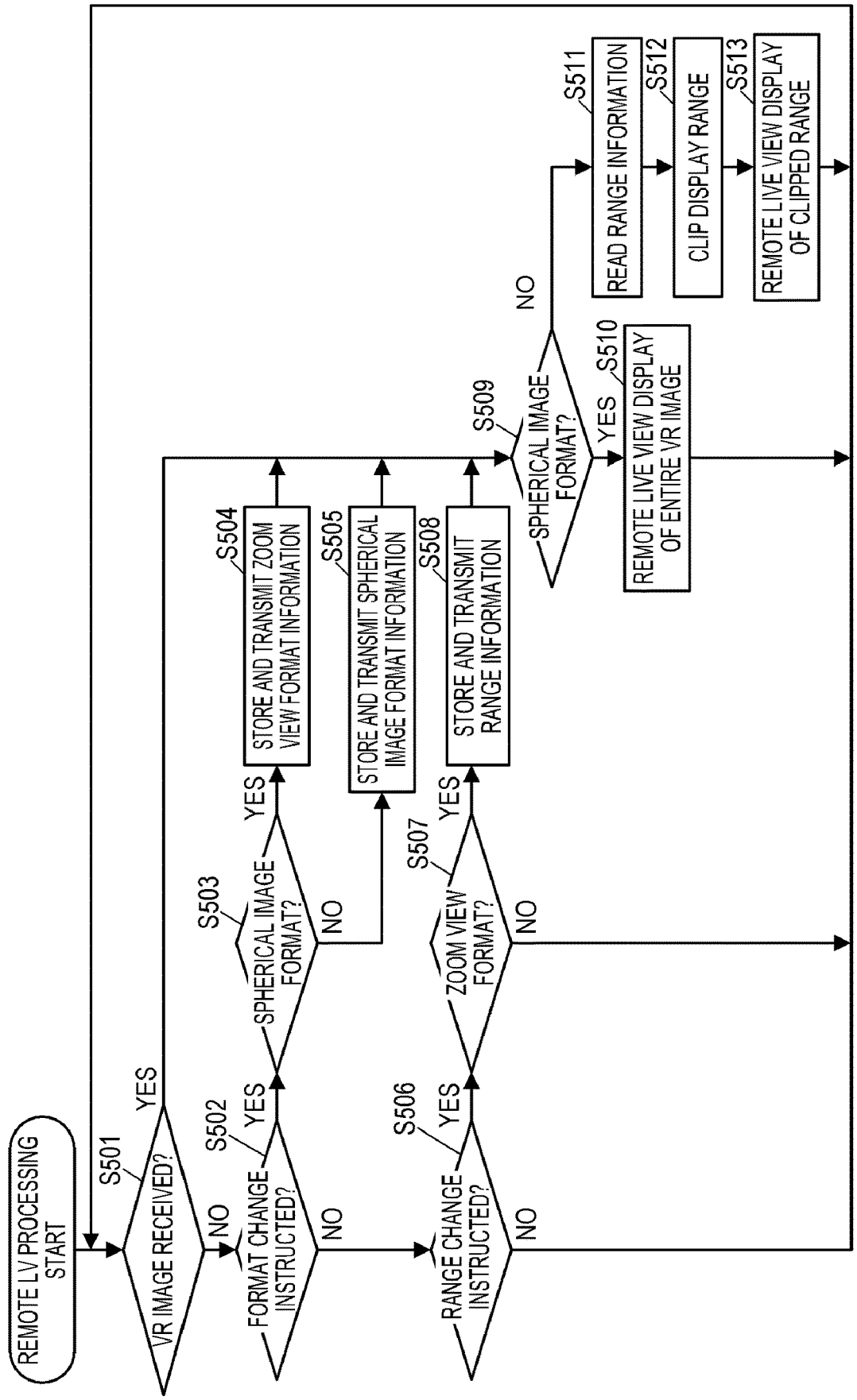
FIG. 5 is a flow chart depicting an example of the remote live view processing.

FIG. 5 is a flow chart depicting an example of the remote live view processing performed by the display control apparatus 200. This processing is implemented by the CPU 201 developing a program, which is recorded in the non-volatile memory 203, in the memory 202, and executing the program. When the power of the display control apparatus 200 is turned ON, and the display control apparatus 200 is set to the display mode to perform the remove live view display of the VR image captured by the digital camera 100, the processing in FIG. 5 starts.

In S501, the CPU 201 determines whether or not the captured VR image (equidistant cylindrical projection) was received from the digital camera 100 (image-capturing apparatus). Processing advances to S509 if the VR image was received, or to S502 if not. In this embodiment, the VR image is received from the digital camera 100 via the communication I/F 210.

In S502, the CPU 201 determines whether or not the user instructed the format change (instruction to change the display format: format change operation). Processing advances to S503 if the format change was instructed, or to S506 if not.

In S503, the CPU 201 determines whether or not the current display format is the spherical image format. Processing advances to S504 if the current display format is the spherical image format, or to S505 if not.

In S504, the CPU 201 stores the format information that indicates the zoom view format in the memory 202, so as to switch the display format to the zoom view format (update of the format information stored in the memory 202). Further, the CPU 201 transmits the format information, which indicates the zoom view format, to the digital camera 100 via the communication I/F 210, so as to notify the digital camera 100 that the display format was changed to the zoom view format.

In S505, the CPU 201 stores the format information that indicates the spherical image format in the memory 202, so as to switch the display format to the spherical image format (update of the format information stored in the memory 202). Further, the CPU 201 transmits the format information, which indicates the spherical image format, to the digital camera 100 via the communication I/F 210, so as to notify the digital camera 100 that the display format was changed to the spherical image format.

In S506, the CPU 201 determines whether or not the user instructed the range change (instruction to change the display range: range change operation). Processing advances to S507 if the range change was instructed, or to S501 if not. In S507, the CPU 201 determines whether or not the current display format is the zoom view format. Processing advances to S508 if the current display format is the zoom view format, or to S501 if not. In S508, the CPU 201 stores the range information on the display range after the change in the memory 202, so as to update the display range (update of the range information stored in the memory 202). Further, the CPU 201 transmits the range information that indicates the current display range to the digital camera 100 via the communication I/F 210, so as to notify the digital camera 100 that the display range was changed.

In S509, the CPU 201 determines whether or not the current display format is the spherical image format. Processing advances to S510 if the current display format is the spherical image format, or to S511 if not.

In S510, the CPU 201 displays the VR image (equidistant cylindrical projection) which was received from the digital camera 100, on the display 205, as the remote live view image (update of the image displayed on the display 205).

In S511, the CPU 201 reads the range information (direction of view point and visual angle (angle of view)) from the memory 202. In S512, the CPU 201 performs 3D mapping of the VR image (equidistant cylindrical projection) received from the digital camera 100, and clips the display range from the VR image in accordance with the range information which was read in S511. In S513, the CPU 201 displays the image in the display range, which was clipped in S512, on the display 205 as the remote live view image (update of the image displayed on the display 205).

Figure 6:
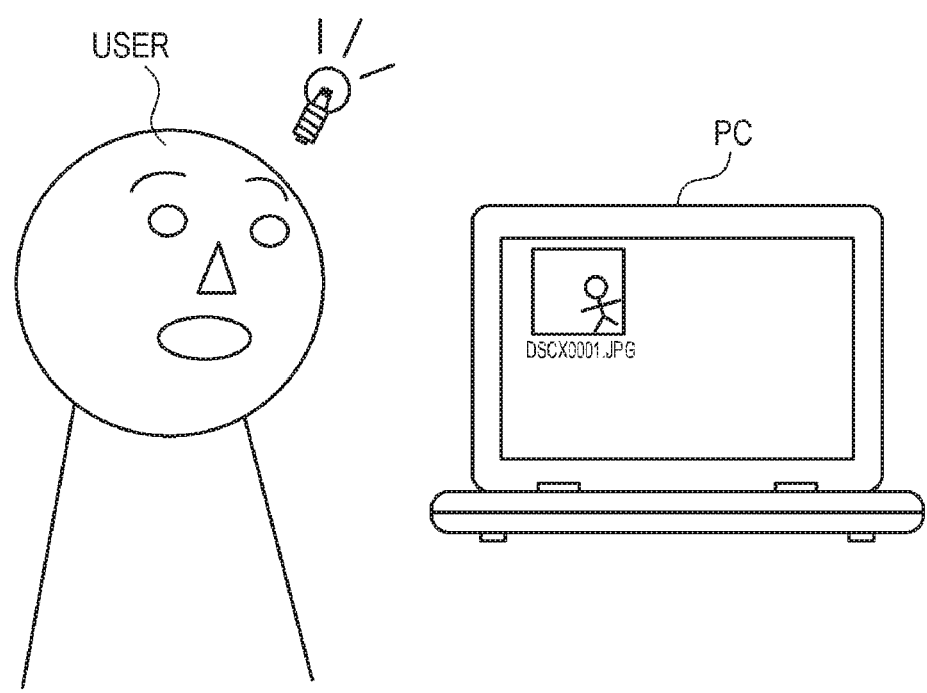
FIG. 6 is an illustration depicting an example of the effect of the present invention.

As described above, according to this embodiment, a thumbnail image corresponding to the range of the live view image is recorded in the file in the case where a partial range of the captured VR image is displayed on the display as the live view image. Therefore, when the captured (recorded) VR image is received on a personal computer (PC) or the like, an image in a range which the user was checking during image capturing is displayed as the thumbnail image of the file of the VR image, as illustrated in FIG. 6. Thereby the impression of the thumbnail image matches with the impression of the display range of the remote live view display during image capturing, hence by merely viewing the thumbnail image, the user can easily recognize which scene of the VR image is captured in each file.

An example in the case where the captured image is the VR image was described, but a similar effect can be implemented by a similar processing even when an image other than the VR image is captured. Further, an example of performing the remote live view display was described, but a display that can execute the live view display may be disposed in the electronic apparatus (digital camera 100) according to this embodiment.

Figure 7:
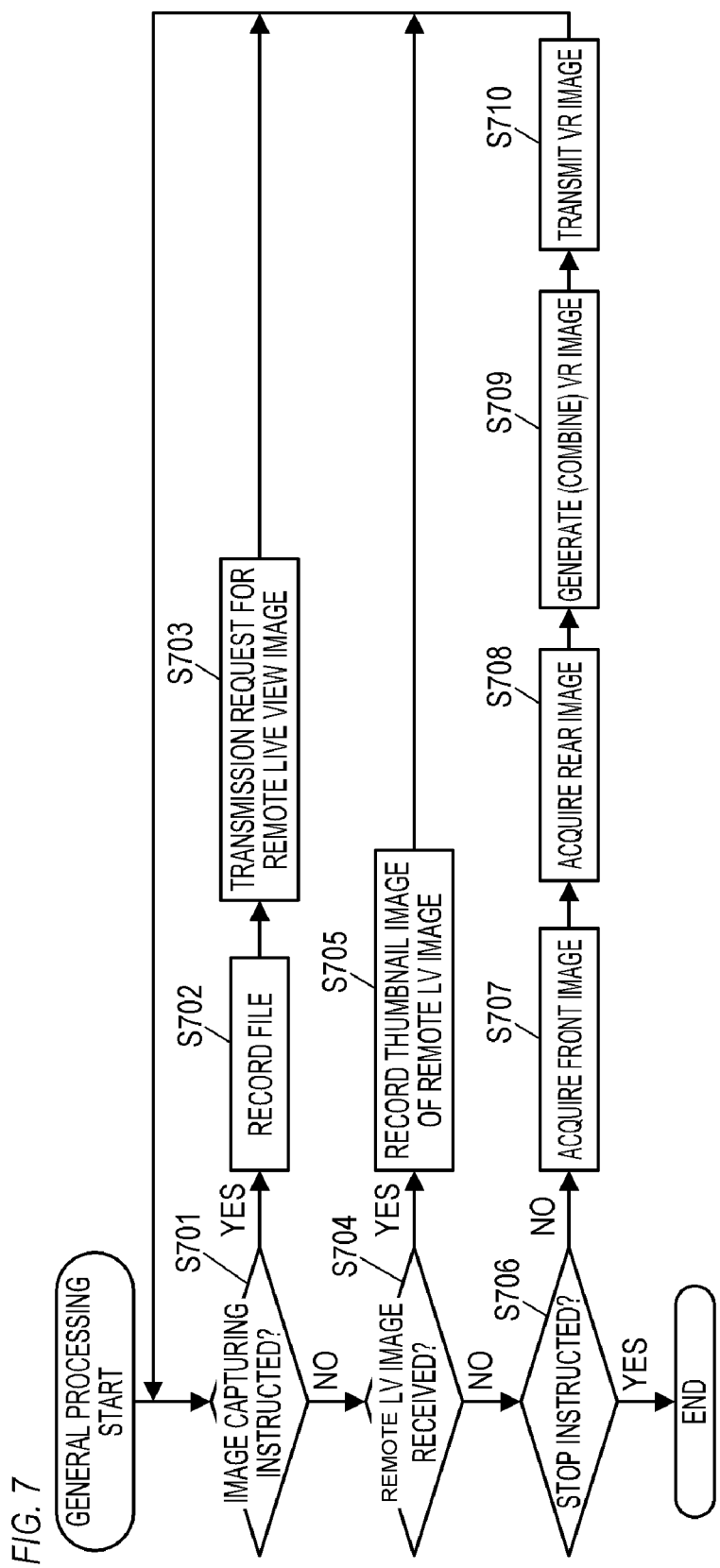
FIG. 7 is a flow chart depicting a modification of the general processing.
Figure 8:
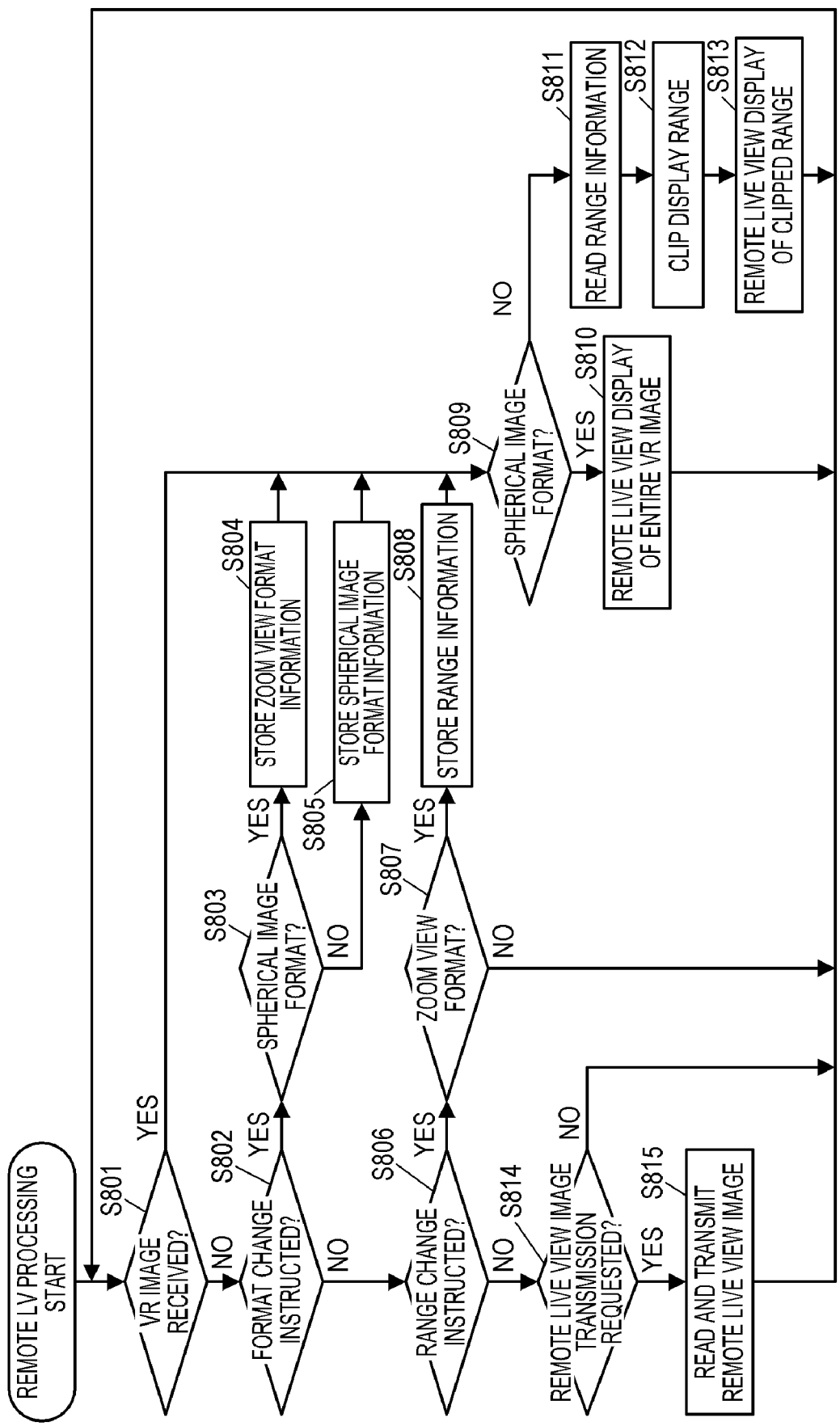
FIG. 8 is a flow chart depicting a modification of the remote live view processing.

Further, an example of the case where the format information and the range information are transmitted from the display control apparatus 200 to the digital camera 100 and the thumbnail image is generated on the basis of this information was described, but the embodiments of the present invention is not limited to this. For example, the digital camera 100 may notify the image capturing timing to the display control apparatus 200, and the display control apparatus 200 may transmit the displayed remote live view image to the digital camera 100. Then the digital camera 100 may record the thumbnail image on the basis of the received remote live view image. FIG. 7 and FIG. 8 are flow charts depicting examples of such processing.

FIG. 7 is a flow chart depicting an example of the general processing of the digital camera 100. This processing is implemented by the system control unit 50 developing the program recorded in the non-volatile memory 56 in the system memory 52 and executing the program. When the power of the digital camera 100 is turned ON, the processing in FIG. 7 starts.

In S701, the system control unit 50 determines whether or not an image capturing instruction was received from the user. Processing advances to S702 if the image capturing instruction was received, or to S704 if not. In S702, the system control unit 50 records the file of the captured VR image (equidistant cylindrical projection) in the recording medium 150. In S703, the system control unit 50 requests the display control apparatus 200 to transmit the remote live view image via the communication unit 54.

In S704, the system control unit 50 determines whether or not the remote live view image was received from the display control apparatus 200. Processing advances to S705 if the remote live view image was received, or to S706 if not. In this embodiment, the remote live view image is received from the display control apparatus 200 via the communication unit 54. In S705, the system control unit 50 records (generates and records) a thumbnail image in the file recorded in S702 on the basis of the remote live view image received from the display control apparatus 200. In concrete terms, a thumbnail image (e.g. image generated by reducing the remote live view image), which indicates the received remote live view image, is recorded in the file.

In S706, the system control unit 50 determines whether or not the user instructed to stop the digital camera 100. If the user instructed to stop the digital camera 100, the system control unit 50 stops the digital camera 100 by performing various types of processing. Then the entire processing in FIG. 7 ends. Processing advances to S707 otherwise.

In S707, the system control unit 50 acquires (captures) a front image using the image-capturing unit 22a. In S708, the system control unit 50 acquires (captures) a rear image using the image-capturing unit 22b. In S709, using the image processing unit 24, the system control unit 50 combines the two images acquired in S707 and S708, so as to generate a single VR image (equidistant cylindrical projection). In S710, the system control unit 50 transmits the VR image generated in S709 (equidistant cylindrical projection) to the display control apparatus 200 via the communication unit 54.

FIG. 8 is a flow chart depicting an example of the remote live view processing performed by the display control apparatus 200. This processing is implemented by the CPU 201 developing the program, which is recorded in the non-volatile memory 203, in the memory 202, and executing the program. When the power of the display control apparatus 200 is turned ON, and the display control apparatus 200 is set to the display mode to perform the remote live view display of the VR image captured by the digital camera 100, the processing in FIG. 8 starts.

In S801, the CPU 201 determines whether or not the captured VR image (equidistant cylindrical projection) was received from the digital camera 100 (image-capturing apparatus). Processing advances to S809 if the VR image was received, or to S802 if not.

In S802, the CPU 201 determines whether the user instructed the format change. Processing advances to S803 if the format change was instructed, or to S806 if not.

In S803, the CPU 201 determines whether or not the current display format is the spherical image format. Processing advances to S804 if the current display format is the spherical image format, or to S805 if not. In S804, the CPU 201 stores the format information that indicates the zoom view format in the memory 202, so as to switch the display format to the zoom view format (update of the format information stored in the memory 202). In S805, the CPU 201 stores the format information that indicates the spherical image format in the memory 202, so as to switch the display format to the spherical image format (update of the format information stored in the memory 202).

In S806, the CPU 201 determines whether or not the user instructed the range change. Processing advances to S807 if the range change was instructed, or to S814 if not.

In S807, the CPU 201 determines whether or not the current display format is the zoom view format. Processing advances to S808 if the current display format is the zoom view format, or to S801 if not. In S808, the CPU 201 stores the range information on the display range after the change in the memory 202, so as to update the display range (update of the range information stored in the memory 202).

In S809, the CPU 201 determines whether or not the current display format is the spherical image format. Processing advances to S810 if the current display format is the spherical image format, or to S811 if not.

In S810, the CPU 201 displays the VR image (equidistant cylindrical projection), which was received from the digital camera 100, on the display 205, as the remote live view image (update of the image displayed on the display 205). Further, the CPU 201 stores the current remote live view image in the memory 202 (updates the remote live view image stored in the memory 202).

In S811, the CPU 201 reads the range information (direction of view point and visual angle (angle of view)) from the memory 202. In S812, the CPU 201 performs 3D mapping of the VR image (equidistant cylindrical projection) received from the digital camera 100, and clips the display range from the VR image in accordance with the range information which was read in S811. In S813, the CPU 201 displays the image in the display range, which was clipped in S812, on the display 205 as the remote live view image (update of the image displayed on the display 205). Further, the CPU 201 stores the current remote live view image in the memory 202 (update of the remote live view image stored in the memory 202).

In S814, the CPU 201 determines whether or not the digital camera 100 requested transmission of the remote live view image via the communication I/F 210. Processing advances to S815 if transmission was requested, or to S801 if not. In S815, the CPU 201 reads the remote live view image from the memory, and transmits the remote live view image to the digital camera 100 via the communication I/F 210.

The system control unit 50 may start recording of the file of the captured (acquired) moving image responding to the recording start instruction (image capturing instruction) from the user, and stop recording of the file responding to the recording stop instruction from the user. In this case, the system control unit 50 records a thumbnail image, corresponding to the range of the live view image of which file is being recorded, in the file. Since the live view image of which file is being recorded more likely remains as an impression of the user, the user can easily recognize which scene of the moving image is captured in each file by merely viewing the thumbnail image. In particular, the live view image, at a timing when the recording start instruction or the recording stop instruction is received, more likely remains as an impression of the user, therefore it is preferable that a thumbnail image corresponding to the range of the live view image at such a timing is recorded in the file.

Figure 9:
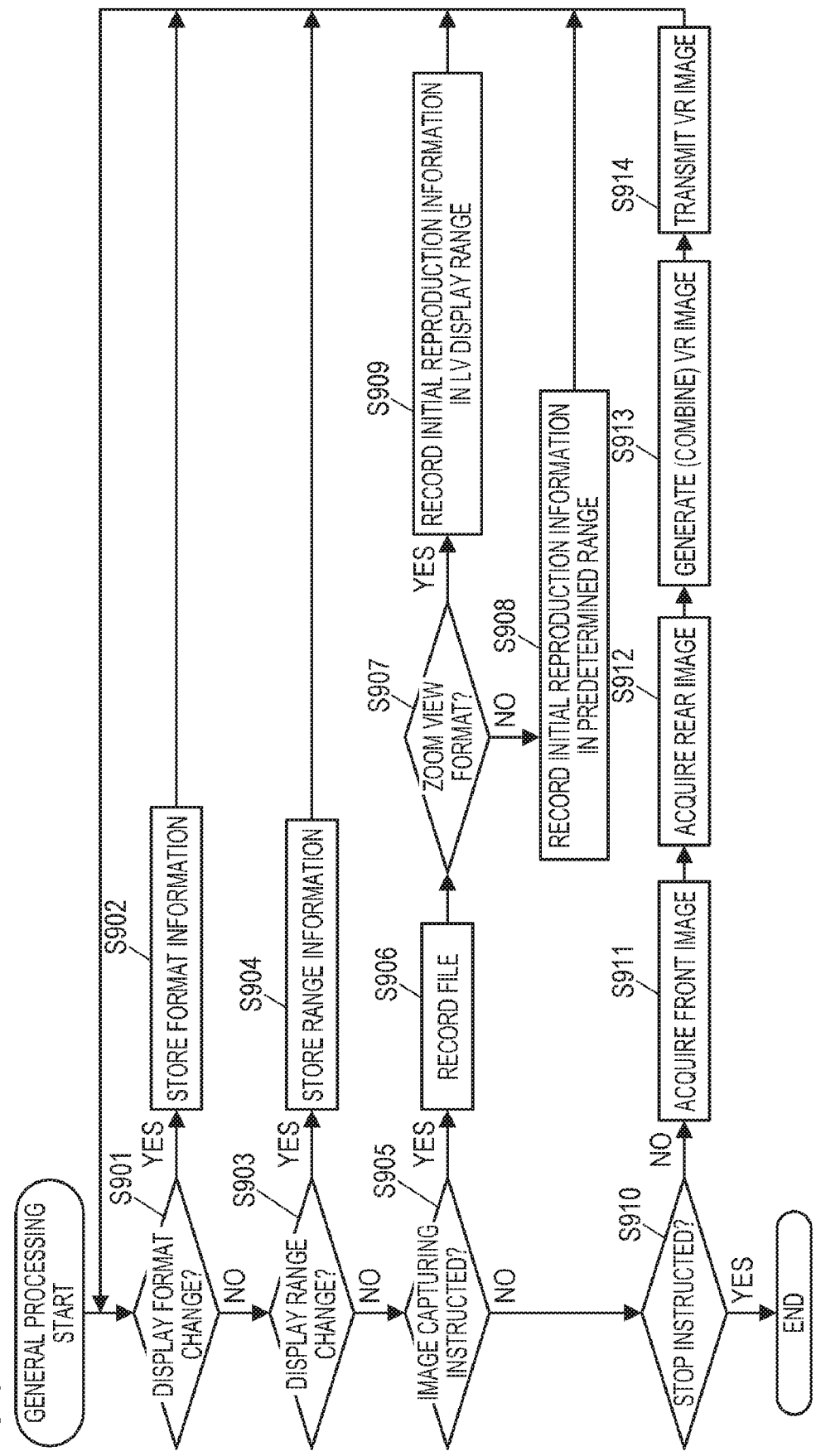
FIG. 9 is a flow chart depicting a modification of the general processing.
Figure 11A:
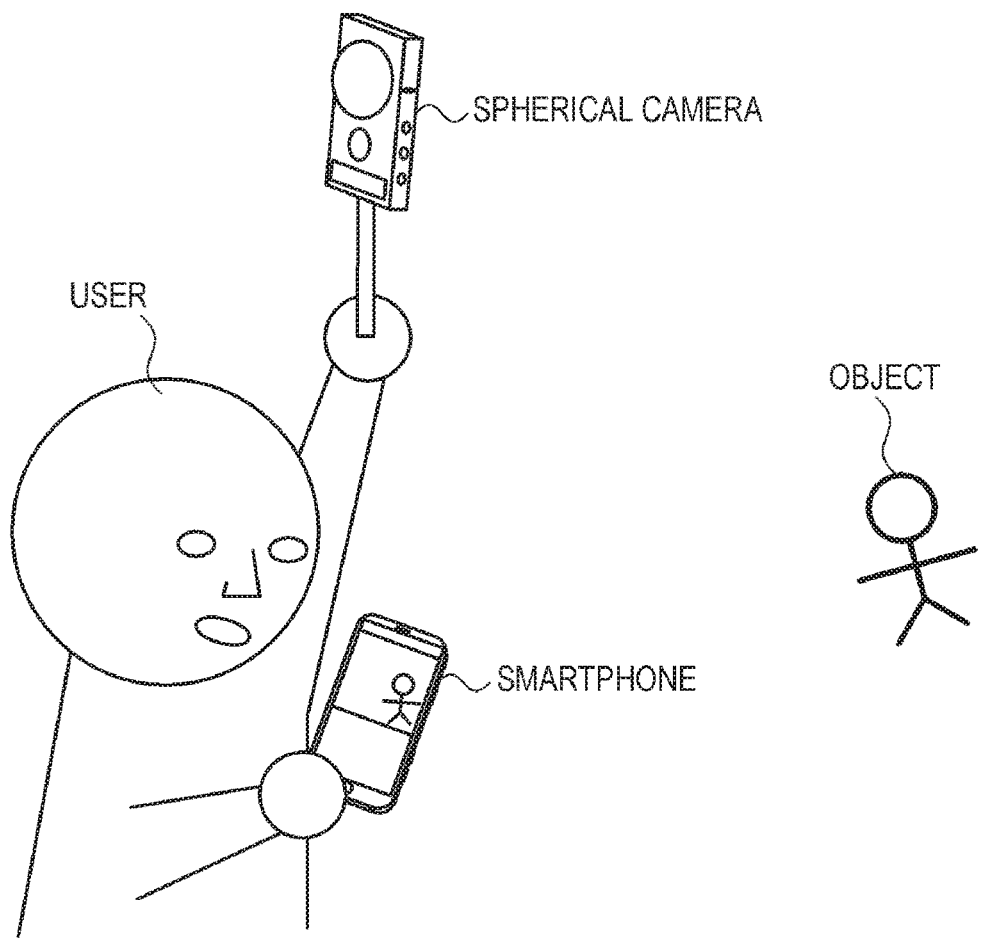
FIG. 11A and FIG. 11B are illustrations depicting an example of a problem to be solved by the present invention.
Figure 11B:
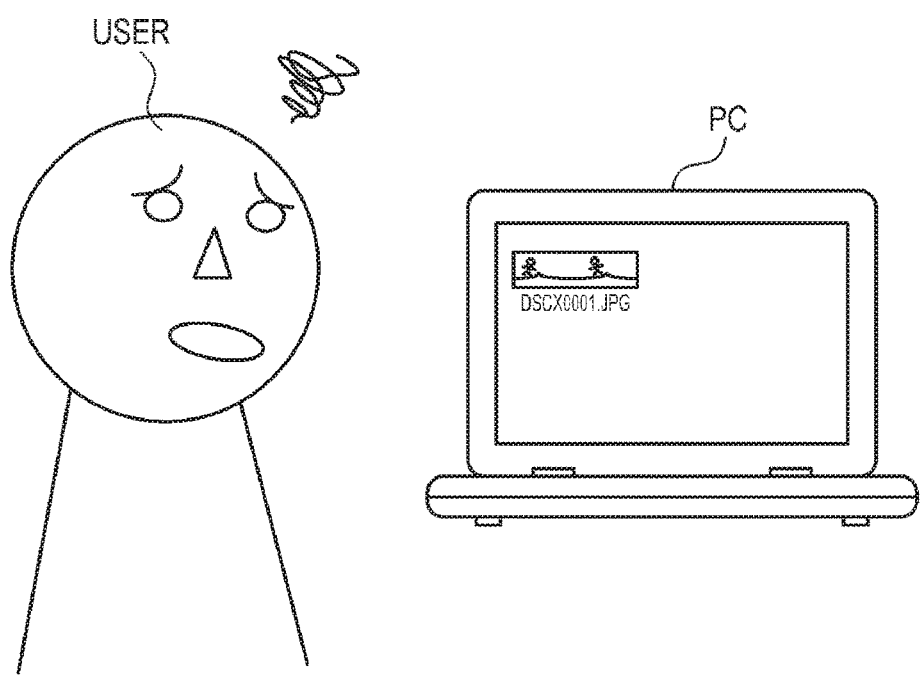

An example of recording a thumbnail image based on the remote live view image in the file was described, but the range information on the range of the remote live view image may be recorded in the file as initial reproduction information on the range that is displayed first when the file is reproduced. Then the impression of the display range when reproduction is started matches with the impression of the display range of the remote live view display during the image capturing, and the user can easily recognize which scene of the VR image is captured in the reproduced file. FIG. 9 and FIG. 10 are flow charts depicting examples of such processing.

FIG. 9 is a flow chart depicting an example of the general processing of the digital camera 100. This processing is implemented by the system control unit 50 developing the program recorded in the non-volatile memory 56 in the system memory 52, and executing the program. When the power of the digital camera 100) is turned ON, the processing in FIG. 9 starts.

In S901, the system control unit 50 determines whether or not a change in the display format of the display control apparatus 200 was notified. Processing advances to S902 if notified, or to S903 if not. In S902, the system control unit 50 stores the format information, which indicates the notified display format (display format after the change; current display format) to the system memory 52 (update of the format information stored in the system memory 52).

In S903, the system control unit 50 determines whether or not the change in the display range of the display control apparatus 200 was notified. Processing advances to S904 if notified, or to S905 if not. In S904, the system control unit 50 stores the range information (direction of the view point and visual angle (angle of view)) on the notified display range (display range after the change; current display range) in the system memory 52 (update of the range information stored in the system memory 52).

In S905, the system control unit 50 determines whether or not the image capturing instruction was received from the user. Processing advances to S906 if the image capturing instruction was received, or to S910 if not. In S906, the system control unit 50 records the file of the captured VR image (equidistant cylindrical projection) in the recording medium 150.

In S907, the system control unit 50 determines whether or not the display format of the display control apparatus 200 is the zoom view format on the basis of the format information stored in the system memory 52. Processing advances to S909 if the display format is the zoom view format, or to S908 if not. In S908, the system control unit 50 records the initial reproduction information (direction of the view point and visual angle (angle of view)) on the image capturing range in a predetermined direction (e.g. front direction) of the digital camera 100, out of the captured VR image, in the file recorded in S906. In S909, the system control unit 50 records the range information (direction of the view point and visual angle (angle of view)) stored in the system memory 52 in the file recorded in S906 as the initial reproduction information.

In S910, the system control unit 50 determines whether the user instructed to stop the digital camera 100. If the user instructed to stop the digital camera 100, the system control unit 50 stops the digital camera 100 by performing various types of processing. Then the entire processing in FIG. 9 ends. Processing advances to S911 otherwise.

In S911, the system control unit 50 acquires (captures) a front image using the image-capturing unit 22a. In S912, the system control unit 50 acquires (captures) a rear image using the image-capturing unit 22b. In S913, using the image processing unit 24, the system control unit 50 combines the two images acquired in S911 and S912, so as to generate a single VR image (equidistant cylindrical projection). In S914, the system control unit 50 transmits the VR image generated in S913 (equidistant cylindrical projection) to the display control apparatus 200 via the communication unit 54.

FIG. 10 is a flow chart depicting an example of the reproduction processing (processing to reproduce a file) performed by the display control apparatus 200. This processing is implemented by the CPU 201 developing the program which is recorded in the non-volatile memory 203, in the memory 202 and executing the program. When the power of the display control apparatus 200 is turned ON, and the user instructs to reproduce a file stored in the recording medium 208, the processing in FIG. 10 starts.

In S1001, the CPU 201 acquires the initial reproduction information (direction of the view point and visual angle (angle of view)) from the reproduction target file. In S1002, the CPU 201 displays a display range in accordance with the initial reproduction information acquired in S1001, out of the VR image recorded in the reproduction target file, on the display 205. If the display format when the image was captured is the spherical image format, the VR image is displayed in the spherical image format. If the display format when the image was captured is the zoom view format, a partial range of the VR image is clipped and displayed so that the display range, which was displayed in the remote live view display when the image was captured, is displayed.

The various controls, which were assumed to be performed by the system control unit 50 and the CPU 201 in the above description, may be performed by one hardware component, or shared by a plurality of hardware components (e.g. a plurality of processors or circuits) so as to control the entire apparatus. In the same manner, various controls, which were assumed to be performed by the CPU 201 in the above description, may be performed by one hardware component, or shared by a plurality of hardware components (e.g. a plurality of processors or circuits), so as to control the entire apparatus.

While the present invention has been described with reference to the preferred embodiments, the embodiments of the present invention is not limited to these specific embodiments, and includes various modes within the scope of not departing from the essence of the invention. Each of the above-mentioned embodiments is merely an example of the invention, and may be combined as required.

In the example described in the above embodiments, the present invention is applied to a digital camera, but the embodiments of the present invention is not limited to this example, and may be applied to any electronic apparatus that can record the files of captured images. For example, the present invention can be applied to a personal computer, a PDA, a portable telephone terminal, a portable image viewer, a printer, a digital photo frame, a music player, a game machine, an electronic book reader and a video player. The present invention can also be applied to a smartphone, a television, a projector, a tablet terminal, an AI speaker, a home electronic device, an onboard unit and a medical apparatus.

According to this disclosure, the user can easily recognize which scene of the image file is captured in a file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-242767, filed on Dec. 26, 2018, which is hereby incorporated by reference herein in its entirety.

What is claimed is:

1. A system comprising an image-capturing apparatus and a display apparatus having a display unit,
wherein the image-capturing apparatus comprises:
a processor; and
a memory storing a program which, when executed by the processor, causes the image-capturing apparatus to:
acquire a captured image;
perform control, so that a file of the acquired image is recorded in a storage, in response to an image capturing instruction from a user;
in a case where a partial range of the captured image is displayed on the display unit as a live view image, perform control so that a thumbnail image corresponding to the live view image is recorded in association with the file; and
acquire the live view image from the display apparatus having the display unit.

2. The system according to claim 1, wherein the program when executed by the processor further causes the image-capturing apparatus to perform control, so that
recording of a file of an acquired moving image is started in response to a recording start instruction that is the image capturing instruction,
recording of the file is stopped in response to a recording stop instruction from the user, and
a thumbnail image corresponding to a live view image at a timing of receiving the recording start instruction is recorded.

3. The system according to claim 1, wherein the program when executed by the processor further causes the image-capturing apparatus to perform control so that
recording of a file of an acquired moving image is started in response to a recording start instruction that is the image capturing instruction,
recording of the file is stopped in response to a recording stop instruction from the user, and
a thumbnail image corresponding to a live view image at a timing of receiving the recording stop instruction is recorded.

4. The system according to claim 1, wherein the program when executed by the processor further causes the image-capturing apparatus, in the case where a partial range of the captured image is displayed on the display unit as a live view image, to perform control, so that information on the partial range of the image corresponding to the live view image is recorded in association with the file as information on a range that is displayed first when the file is reproduced.

5. The system according to claim 1, wherein the captured image is a VR image.

6. A control method of a system comprising an image-capturing apparatus and a display apparatus having a display unit, the control method comprising:

acquiring a captured image by the image-capturing apparatus;

performing control, so that a file of the acquired image is recorded in a storage, in response to an image capturing instruction from a user, by the image-capturing apparatus;

in a case where a partial range of the captured image is displayed on the display unit as a live view image, performing control so that a thumbnail image corresponding to the live view image is recorded in association with the file, by the image-capturing apparatus; and acquiring the live view image from the display apparatus having the display unit, by the image-capturing apparatus.

7. A non-transitory computer readable medium that stores a program, wherein the program causes a computer to execute a control method of a system comprising an image-capturing apparatus and a display apparatus having a display unit, the control method comprising:

acquiring a captured image by the image-capturing apparatus;

performing control, so that a file of the acquired image is recorded in a storage, in response to an image capturing instruction from a user, by the image-capturing apparatus;

in a case where a partial range of the captured image is displayed on the display unit as a live view image, performing control so that a thumbnail image corresponding to the live view image is recorded in association with the file, by the image-capturing apparatus; and acquiring the live view image from the display apparatus having the display unit, by the image-capturing apparatus.

* * * * *